(12) United States Patent
Evans

(10) Patent No.: US 6,861,131 B2
(45) Date of Patent: Mar. 1, 2005

(54) HYBRID COMPOSITE ARTICLES AND METHODS FOR THEIR PRODUCTION

(75) Inventor: David A. Evans, Lowell, MA (US)

(73) Assignee: Complastik Corp., Lowell, MA (US)

( * ) Notice: Subject to any disclaimer, the term of this patent is extended or adjusted under 35 U.S.C. 154(b) by 283 days.

(21) Appl. No.: 10/007,055

(22) Filed: Dec. 6, 2001

(65) Prior Publication Data

US 2002/0176979 A1 Nov. 28, 2002

Related U.S. Application Data

(60) Provisional application No. 60/251,675, filed on Dec. 6, 2000, and provisional application No. 60/255,631, filed on Dec. 14, 2000.

(51) Int. Cl.[7] .................................................. B32B 3/26
(52) U.S. Cl. ................. 428/304.4; 428/220; 428/304.4; 428/317.9; 428/323; 428/332; 427/181; 427/208.4; 427/213.31; 427/213.3; 427/245; 427/372.2; 427/272.2
(58) Field of Search .............................. 428/220, 292.1, 428/304.4, 323, 332, 317.9, 195, 262, 902, 361; 427/181, 208.4, 213.3, 245, 273.7; 264/22, 103, 135, 137

(56) References Cited

U.S. PATENT DOCUMENTS

| | | | |
|---|---|---|---|
| 3,632,366 A | * | 1/1972 | Hiraga et al. ............... 427/221 |
| 3,713,962 A | | 1/1973 | Ackley |
| 3,742,106 A | | 6/1973 | Price |
| 3,784,433 A | | 1/1974 | Garnish et al. |
| 3,862,287 A | | 1/1975 | Davis |
| 3,939,024 A | | 2/1976 | Hoggatt |
| 3,993,726 A | | 11/1976 | Moyer |
| 3,993,843 A | | 11/1976 | Vasta |
| 4,058,581 A | | 11/1977 | Park |
| 4,187,142 A | | 2/1980 | Pickelman et al. |
| 4,222,918 A | | 9/1980 | Zentner et al. |
| 4,474,906 A | | 10/1984 | Nakama et al. |
| 4,489,129 A | | 12/1984 | Shue et al. |
| 4,549,920 A | | 10/1985 | Cogswell et al. |
| 4,559,262 A | | 12/1985 | Cogswell et al. |

(List continued on next page.)

FOREIGN PATENT DOCUMENTS

| | | |
|---|---|---|
| DE | 40 32 934 A1 | 4/1992 |
| EP | 0 376 654 A2 | 7/1990 |
| EP | 0 406 067 A1 | 1/1991 |
| FR | 2 147 839 | 3/1973 |
| GB | 1 544 249 | 4/1979 |
| GB | 1 570 000 | 6/1980 |
| WO | WO 86/03449 A1 | 6/1986 |
| WO | WO 92/00182 A1 | 1/1992 |
| WO | WO 93/02127 A1 | 2/1993 |
| WO | WO 96/08524 A1 | 3/1996 |

OTHER PUBLICATIONS

May, L.C. et al., "Graphite–Reinforced Thermoplastics", 31st Annual Technical Conference, Feb. 3, 1976.
S.G. Hill et al., "Advanced Thermoplastic Composite Development", U.S. Department of Commerce NTIS, May 1979.

Primary Examiner—Merrick Dixon
(74) Attorney, Agent, or Firm—Greenfield & Sacks, P.C.

(57) ABSTRACT

The present invention relates to high quality composite materials from fibrous materials, in which the composite incorporates a polymer matrix embedding individual fibers. The matrix is derived from polymer particles which penetrate into a strand and substantially fill gaps between individual fibers. Such penetration can occur by exposing the strand to a stable emulsion of the polymer particles. The invention also relates to novel composite structures which incorporation of various types of fibrous segments. These composite structures allow the use of inexpensive and readily available scrap materials. The composites of the present invention are lightweight materials displaying enhanced strength and durability.

27 Claims, 8 Drawing Sheets

U.S. PATENT DOCUMENTS

| | | | |
|---|---|---|---|
| 4,588,538 A | | 5/1986 | Chung et al. |
| 4,626,306 A | * | 12/1986 | Chabrier et al. ............ 156/180 |
| 4,680,224 A | | 7/1987 | O'Connor |
| 4,731,276 A | | 3/1988 | Manning et al. |
| RE32,772 E | | 10/1988 | Hawley |
| 4,792,481 A | | 12/1988 | O'Connor et al. |
| 4,838,974 A | | 6/1989 | Nied et al. |
| 4,874,563 A | | 10/1989 | McMahon et al. |
| 4,883,552 A | | 11/1989 | O'Connor et al. |
| 4,894,105 A | * | 1/1990 | Dyksterhouse et al. ..... 156/181 |
| 4,900,499 A | | 2/1990 | Mills |
| 4,921,558 A | | 5/1990 | Johnson et al. |
| 5,017,643 A | | 5/1991 | Snelling et al. |
| 5,019,427 A | | 5/1991 | Soules |
| 5,024,876 A | | 6/1991 | Bobsein et al. |
| 5,055,242 A | * | 10/1991 | Vane ......................... 264/463 |
| 5,057,338 A | | 10/1991 | Baucom et al. |
| 5,076,872 A | | 12/1991 | Nakagawa et al. |
| 5,084,222 A | | 1/1992 | Glemet et al. |
| 5,091,036 A | | 2/1992 | Taylor |
| 5,102,690 A | | 4/1992 | Iyer et al. |
| 5,114,516 A | | 5/1992 | Pilling et al. |
| 5,124,073 A | | 6/1992 | Goffing et al. |
| 5,128,198 A | | 7/1992 | Dyksterhouse et al. |
| 5,128,199 A | | 7/1992 | Iyer et al. |
| 5,207,850 A | | 5/1993 | Parekh |
| 5,210,128 A | | 5/1993 | Johnson |
| 5,213,843 A | | 5/1993 | Working |
| 5,227,236 A | * | 7/1993 | Handermann ................ 428/361 |
| 5,275,883 A | * | 1/1994 | Leone et al. ................. 428/373 |
| 5,286,561 A | | 2/1994 | Johnson et al. |
| 5,344,687 A | | 9/1994 | Grimnes |
| 5,355,567 A | | 10/1994 | Holliday |
| 5,464,684 A | | 11/1995 | Vogelsang et al. |
| 5,529,652 A | * | 6/1996 | Asai et al. ................... 156/180 |
| 5,549,807 A | | 8/1996 | Bell et al. |
| 5,549,965 A | | 8/1996 | Heinrich et al. |
| 5,569,344 A | | 10/1996 | Grimnes |
| 5,593,758 A | * | 1/1997 | Lopez et al. .............. 428/195.1 |
| 5,614,139 A | | 3/1997 | Cutolo et al. |
| 5,618,367 A | | 4/1997 | Wilkinson et al. |
| 5,624,386 A | | 4/1997 | Tailor et al. |
| 5,658,510 A | | 8/1997 | Carraro et al. |
| 5,660,923 A | | 8/1997 | Bieler et al. |
| 5,725,710 A | | 3/1998 | Pfeiffer et al. |
| 5,747,137 A | | 5/1998 | Cutolo et al. |
| 5,756,206 A | | 5/1998 | Davies et al. |
| 5,817,223 A | | 10/1998 | Maloney |
| 5,827,608 A | | 10/1998 | Rinehart et al. |
| 5,856,252 A | | 1/1999 | Lange et al. |
| 5,980,714 A | | 11/1999 | Puyenbroek et al. |
| 6,093,359 A | | 7/2000 | Gauchel et al. |
| 6,616,971 B2 | | 9/2003 | Evans |

* cited by examiner

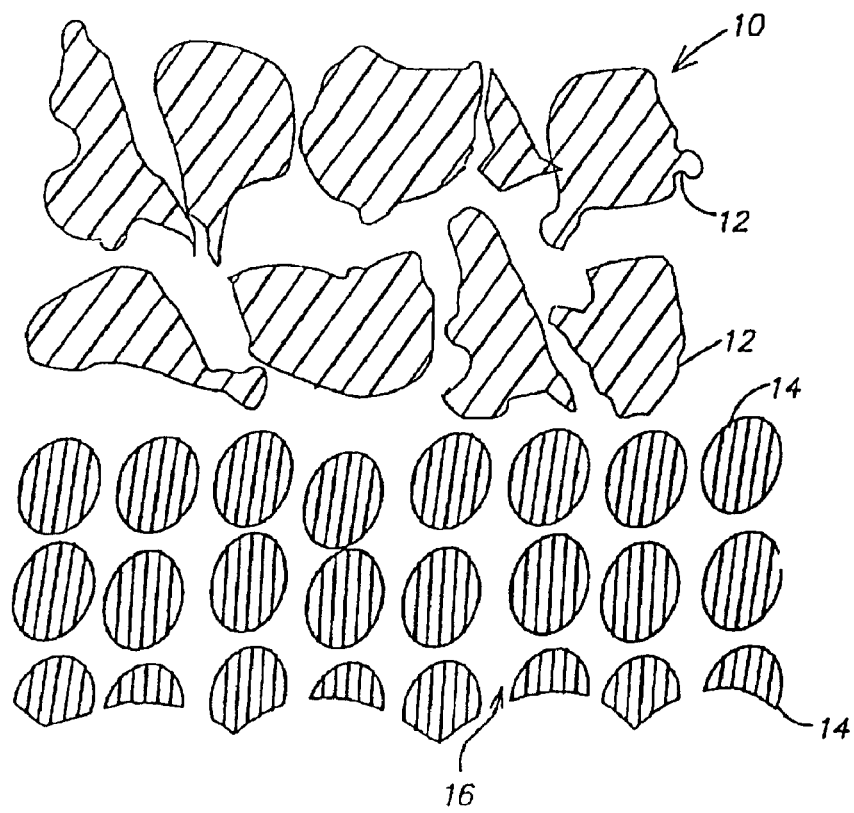
FIG. 1
(PRIOR ART)
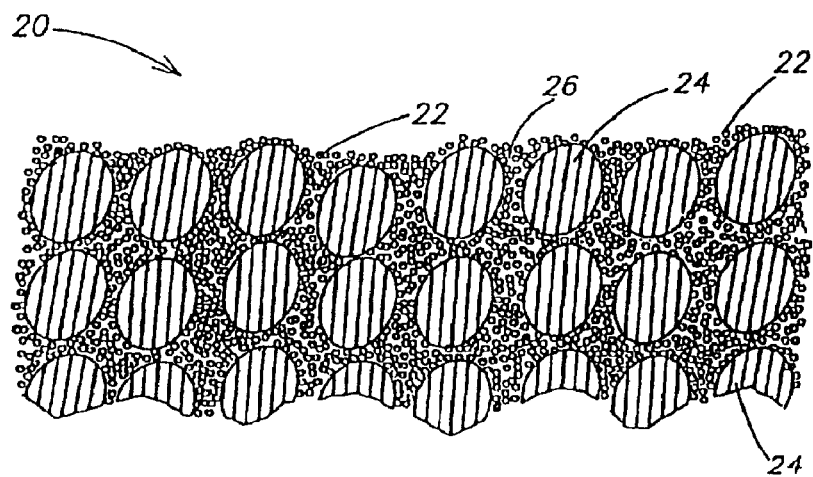
FIG. 3

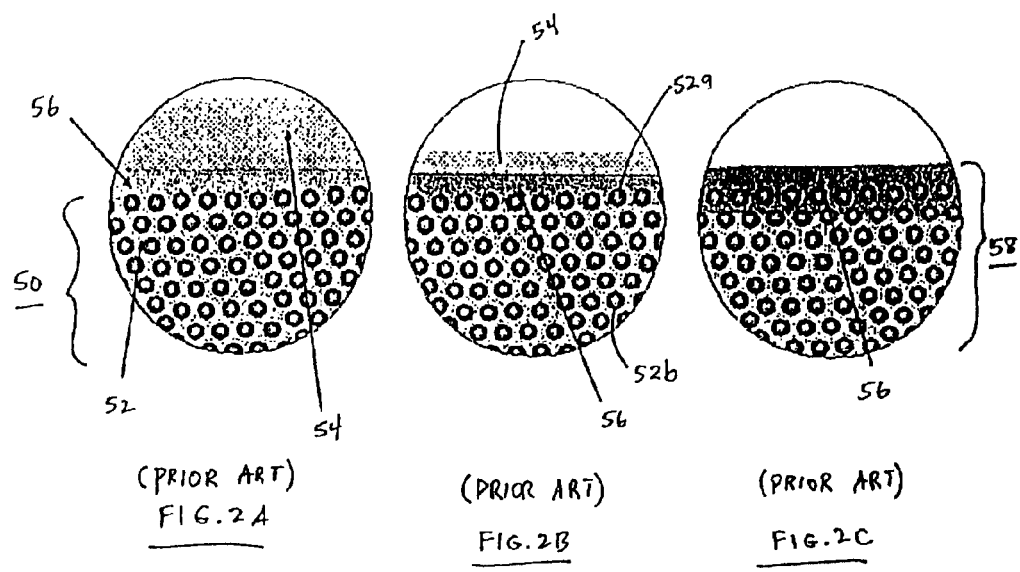
(PRIOR ART)
FIG. 2A
(PRIOR ART)
FIG. 2B
(PRIOR ART)
FIG. 2C

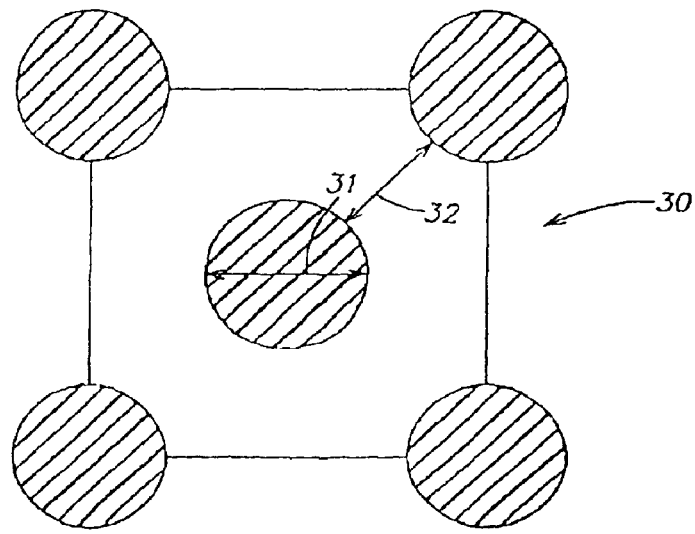
FIG. 4
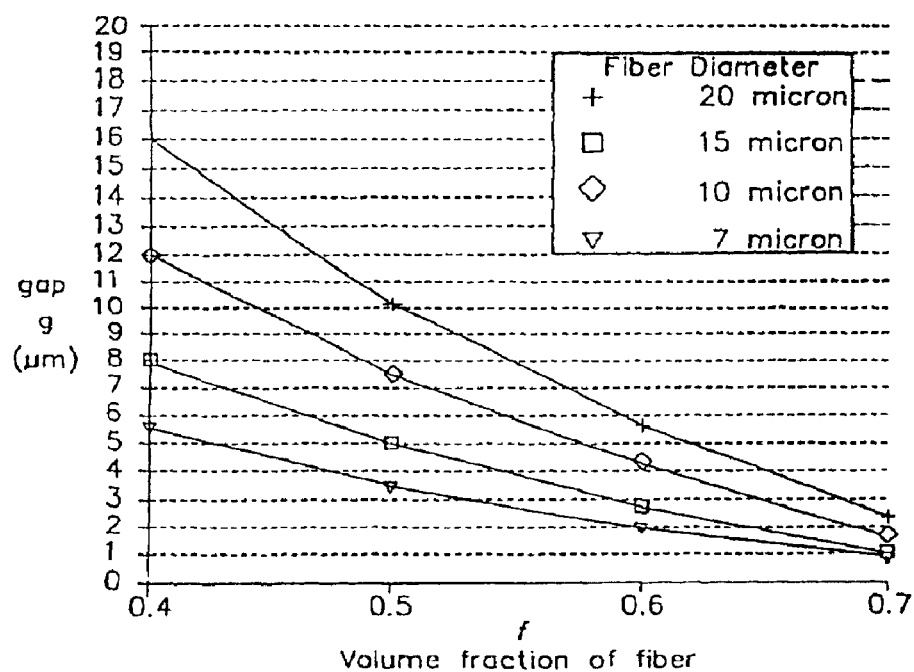
FIG. 5

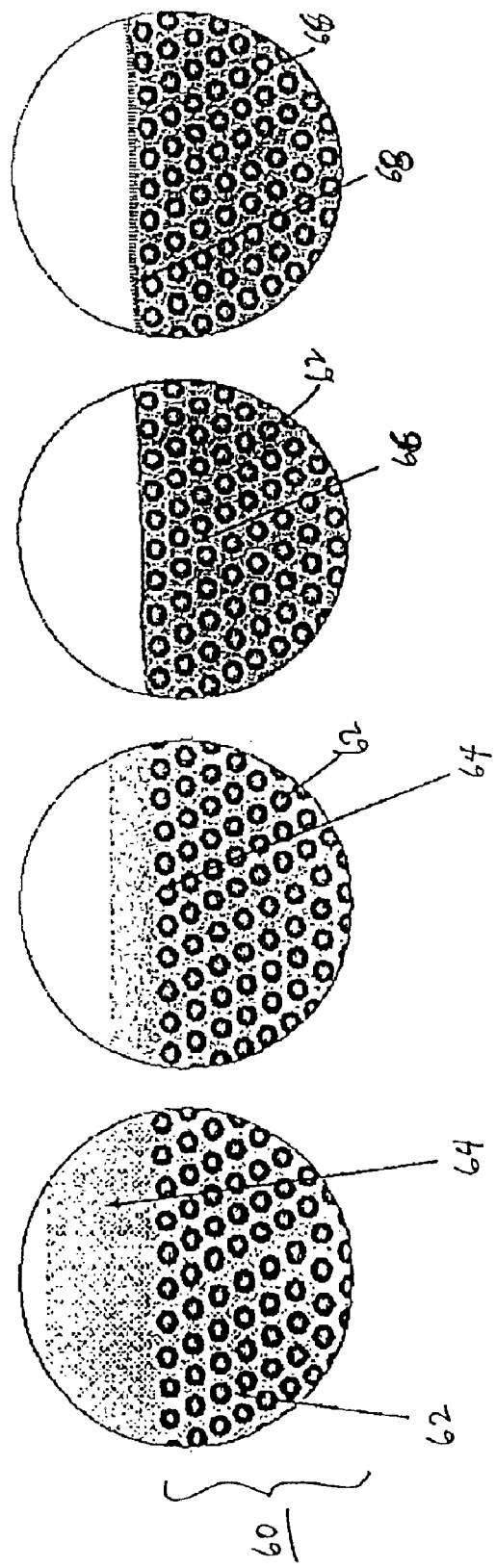

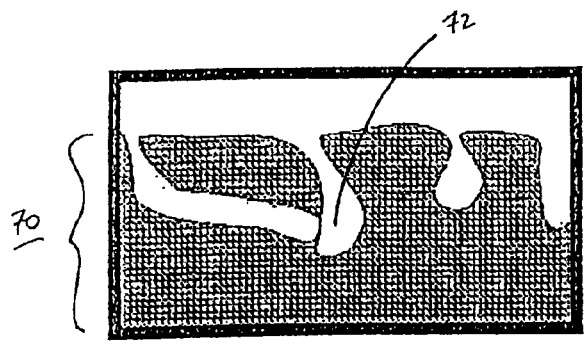
FIG. 7A (PRIOR ART)
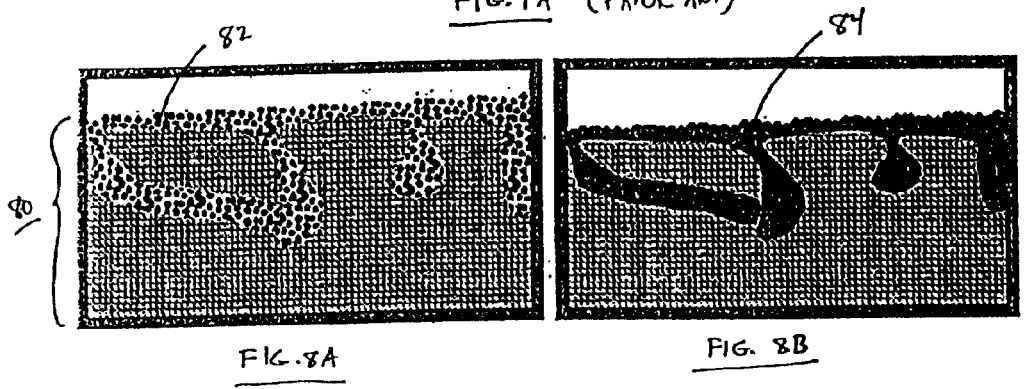
FIG. 8A  FIG. 8B
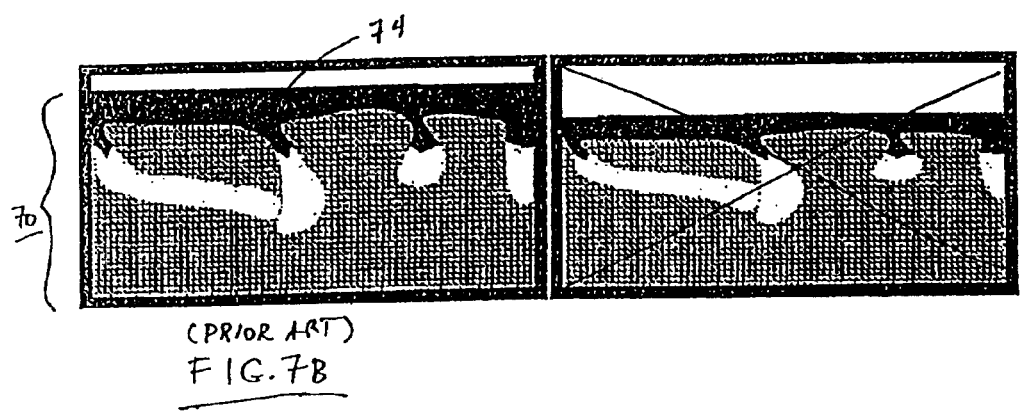
(PRIOR ART)
FIG. 7B

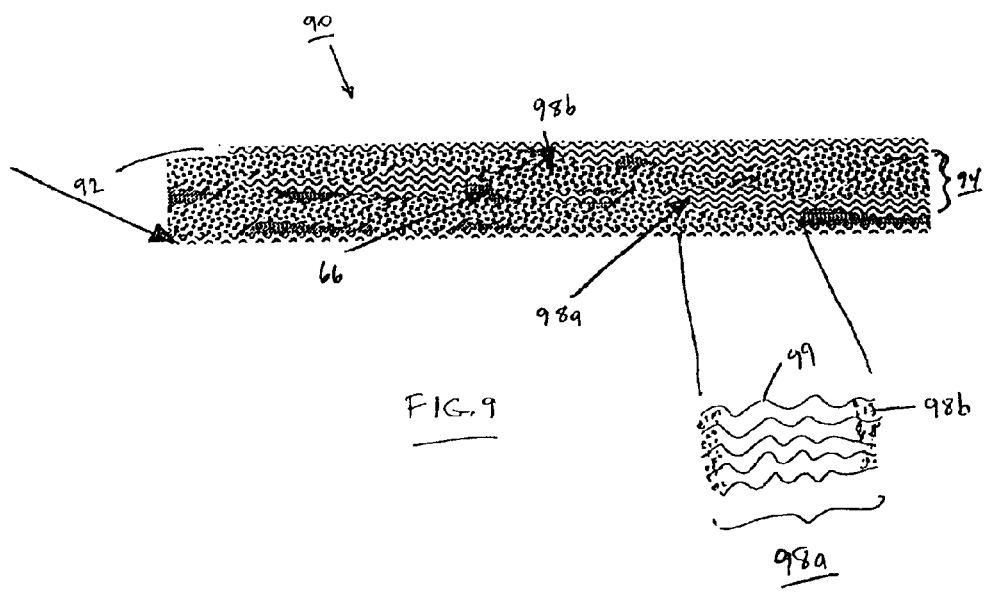
FIG. 9

Figure 10 wood chip/glass fabric chunk laminate with 24 oz woven roving skins
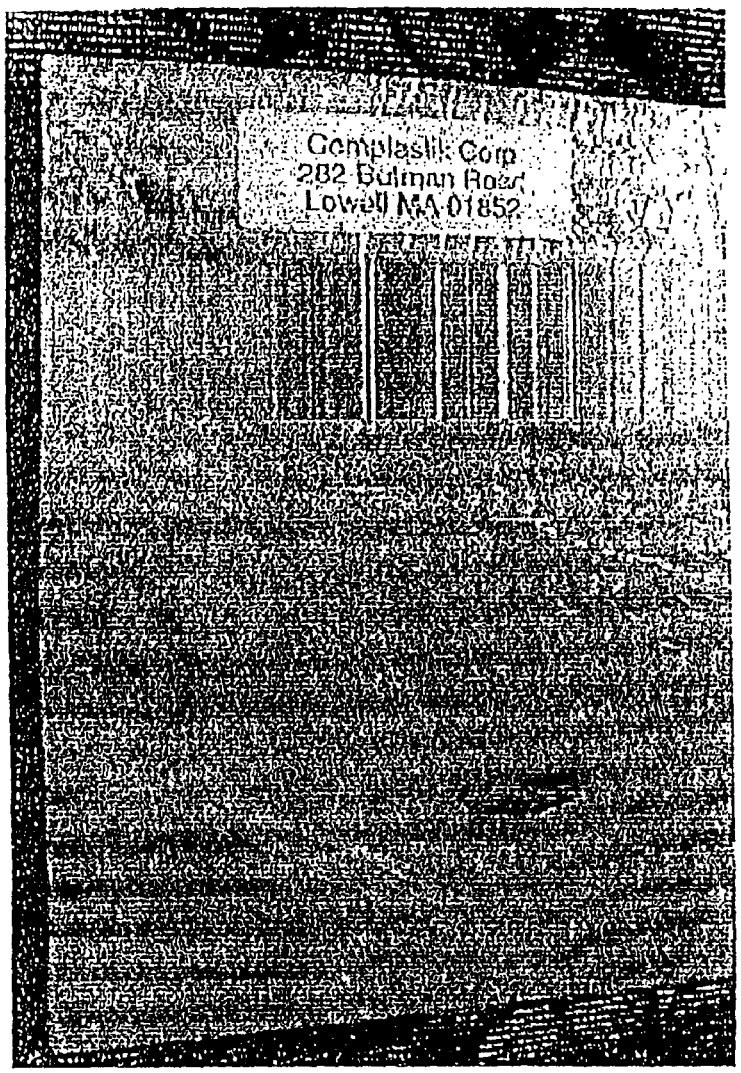

Figure 11
Laminate boards made from waste glass fabric and wood chips. The amount of glass increases in the boards from left to right. The white veins of the "marbling" are glass and the dark areas are wood.

HYBRID COMPOSITE ARTICLES AND METHODS FOR THEIR PRODUCTION

RELATED APPLICATIONS

This application claims benefit under 35 U.S.C. § 119(e) of priority of Provisional Application Ser. No. 60/251,675 filed Dec. 6, 2000, and Provisional Application Ser. No. 60/255,631, filed Dec. 14, 2000, both of which are incorporation herein by reference.

FIELD OF INVENTION

The present invention relates to hybrid composite articles such as fiber resin composites, and particularly inexpensive composites made from scrap or surplus fibers. The composites comprise a polymer matrix embedding individual fibers, as derived from composite prepregs having a coating of polymer particles substantially filling gaps between the individual fibers. The invention further relates to methods for making such composite articles, such as the use of a stable emulsion with polymer particles of sufficiently small size to penetrate gaps between individual fibers. The invention also relates to other composite articles in which a porous material has a polymer matrix embedded within pores of the material.

BACKGROUND OF THE INVENTION

There has been a long-felt need for lightweight fiber-resin composite materials which display greater strength than currently known composites. Fiber resin composites include fibrous articles, sheets and strands (tows or yarns) which incorporate a polymer matrix embedding fiber bundles of the article, sheet or strand. One major application of these composites are materials for military airplanes.

There are two major types of fibers used in composites—chopped glass fibers and continuous fibers. Chopped glass fibers are used to make composites of relatively lower strength. These composites contain from 20% to 40% of fiber by volume, usually as a mat, as described in U.S. Pat. No. 3,713,962. Stiffer and/or stronger composites use continuous fibers in yarn form and contain more than 50% fiber by volume. Examples of stiffer fibers include graphite, polyaramid or special glass fibers. As the volume of fiber in the composite increases, however, obtaining a uniform matrix between the fibers tends to be more difficult.

Composites are often prepared via a "prepreg," i.e. a composite precursor, in which the fibrous articles or strands are impregnated with a polymer matrix precursor, as exemplified by U.S. Pat. No. 3,784,433). Prepregs are typically placed in a mold with the fibers positioned in a desired sequence and orientation and subsequently heated under pressure to fuse or polymerize the precursor components to form the polymer matrix of the final composite. The prepreg allows control of the resin content and fiber orientation. Prepregs can be provided as collimated tapes or fabrics.

One type of polymer matrix comprises thermoset plastics or resins. Thermoset resins typically are prepared from precursor mixtures comprising an oligomer and a crosslinking reagent. To make a composite from thermosets, a fiber strand is preimpregnated with a low viscosity mixture of thermoset precursors. The low viscosity can be provided by solvent, heat or emulsification. The prepreg is then "B-staged" to increase the viscosity, in which "B-staging involves heating the prepreg to a mild temperature to initiate the cure reaction of the precursor mixture. The prepreg is cooled to stop the reaction when the mixture is sufficiently thick. A final cure step is applied to consolidate the fibers and fill gaps, and the curing usually involves the application of pressure, heat or energy. The precursor mixture reacts to form a hard, three-dimensional, cross-linked polymer matrix. Incorporating thermoset resins in composites is a relatively facile process because the starting components of thermosets are either liquid resins or solutions of the precursors. These liquids have low viscosities ranging from 100 to 5,000 centipoise which allow rapid wetting of the fibers. Yarns of glass, graphite or polyaramid are easily penetrated by the low viscosity resin to the core of the yarn, thus providing each fiber with a complete coating of polymer.

Thermoset composites suffer from several disadvantages, however. Complex and long cure cycles may be necessary to produce polymer matrices with a low number of voids, as exemplified by the process of U.S. Pat. No. 5,954,898. Other processes use low molding pressures to avoid damage to the fibers. These low pressures, however, make it difficult to suppress the formation of bubbles within the composite which can result in voids or defects in the matrix coating. Thus, most processing problems with thermoset composites are concerned with removing entrained air or volatiles so that a void-free matrix is produced. Thermoset composites made by the prepreg method require lengthy cure times with alternating pressures to control the flow of the resin as it thickens to prevent bubbles in the matrix. Some high volume processes, such as resin infusion avoid the prepreg step but still require special equipment and materials along with constant monitoring of the process (e.g. U.S. Pat. Nos. 4,132,755, and 5,721,034). Thermoset polymers are not easy to process, regardless of whether the resin is applied to the yarns before molding or is infused into a preform of fibers. Although thermoset polymers have enjoyed success as in lower performance composites, the difficulties in processing these resins has restricted their application, particularly for high performance use.

To overcome some of the disadvantages of thermosets, the use of thermoplastic resins as a polymer matrix in composites has been attempted. In addition, composites formed from thermoplastics should generally be stronger than those formed from thermosets. Thermoplastic resins are long chain polymers of high molecular weight. These polymers are highly viscous when melted and are often non-Newtonian in their flow behavior. Thus, whereas thermosets have viscosities in the range of 100 to 5,000 centipoise, thermoplastics have melt viscosities ranging from 5,000 to 20,000,000 centipoise, and more typically from 100,000 to 20,000 centipoise.

Despite a viscosity difference of three orders of magnitude between thermosets and thermoplastics, the same general processes have been applied to both types of matrices for preparing composite materials. In particular, the prior art has relied on a process of (1) melting the thermoplastic; and (2) forcing the melted thermoplastic through a fibrous material, i.e. the use of melt flow. Causing melt flow of highly viscous thermoplastics requires the application of high temperatures and/or pressures which can be inherently destructive to the fibers, resulting in fiber damage or distortion. In addition, it has yet to be shown that melt flow in itself is capable of forming a void-free matrix, particularly when the matrix is used to embed individual fibers.

More specifically, most of the processes used to form thermoplastic prepregs involve coating the outside of the fiber bundles with a thermoplastic polymer powder rather than coating individual fibers. The polymer powder is then melted to force the polymer around, into and onto the individual fibers.

This process can suffer the disadvantages of melt flow as described above. The long pathway from the outside of the strand to the gaps between the fibers renders filling these gaps highly unlikely. A few processes apply melt directly to the fibers. A tape can be made by coating a dry tape of collimated fibers with the polymer and applying a heated process that forces the polymer into and around the fibers (e.g., see U.S. Pat. Nos. 4,549,920 and 4,559,262). Again, melt flow is required to form the matrix, and a void-free matrix is not assured.

Other processes for incorporating thermoplastics in composites involve preparing a thermoplastic slurry and melting and forcing the slurry onto the yarn (U.S. Pat. No. 5,019,427). A few thermoplastics can be dissolved and introduced into the fiber bundle as a solution. Removal of solvent presents extra processing problems, however. Alternatively, U.S. Pat. No. 5,725,710 describes pretreating the fibers with a dilute dispersion to ease the passage of the melt polymer in a subsequent pultrusion step to make a tape prepreg. Another process involves commingling, in which structural fibers such as graphite or glass are mixed with a thermoplastic fiber and the subsequent hybrid yarn is woven into a fabric to be molded later (e.g., see U.S. Pat. Nos. 5,355,567, 5,227,236 and 5,464,684). Separate yarns of thermoplastic and reinforcement containing many thousands of filaments, however, cannot be mixed mechanically in a one-by-one arrangement of each fiber. The fibers, at best, are dispersed as smaller bundles. The laminates produced by this process typically contain areas that are resin rich and other areas that are mainly fiber and hence void-containing. Commingled thermoplastics are also restricted to only those polymers which form fibers.

Some coating processes, such as the process described in U.S. Pat. No. 4,626,306, involve forcing large particles into a strand. Other processes involve opening the strand to accept large particle, as described in U.S. Pat. No. 5,275,883. Opening the strand and closing the strand after the addition of polymer particles adds extra steps to the coating process. In addition, mere coating of strands inherently results in an insufficient amount of polymer to form a void-free matrix.

In general thermoplastic composites have had limited success to date, due to a variety of factors including high temperatures, high pressures, and prolonged molding times needed to produce good quality laminates. Most of the efforts have been focused on combining high performance polymers to structural fibers which has only exacerbated the process problems.

SUMMARY OF THE INVENTION

One aspect of the present invention provides a method of forming a composite. The method comprises the steps of providing a strand comprising a plurality of fibers. The strand is exposed to a stable emulsion comprising polymer particles. The method further comprises allowing the particles polymer particles to penetrate gaps between individual fibers.

Another aspect of the present invention provides an article, comprising a mixture comprising fibrous segments and polymer particles. A portion of the particles penetrate substantially all ends of individual fibers in the fibrous segments, and the entire article is substantially rigid.

Another aspect of the present invention provides a composite, comprising a plurality of fibrous segments and a polymer matrix embedding the fibrous segments and ends of individual fibers of the fibrous segments.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

FIG. 1 is a schematic cross-section of a prior art prepreg;

FIG. 2A is a schematic cross-section of a strand immediately upon exposure to an unstable emulsion;

FIG. 2B is a schematic cross-section of a partially dried emulsion of FIG. 2A, in which a layer of particles has settled out of suspension;

FIG. 2C is a schematic cross-section of a prepreg resulting from complete drying of the emulsion of FIG. 2A, in which a dense layer of particles coats the outer surface of the strand;

FIG. 3 is a schematic cross-section of a prepreg having particles of a sufficiently small size to impregnate gaps between individual fibers;

FIG. 4 is a theoretical, schematic fiber bundle in a cubic close-packed arrangement, enabling a calculation of gap sizes;

FIG. 5 is a plot of volume fraction of fibers having a cubic close-packed arrangement (abscissa) versus gap size (ordinate);

FIG. 6A is a schematic cross-section of a strand immediately upon exposure to a stable emulsion;

FIG. 6B is a schematic cross-section of a partially dried emulsion of FIG. 6A, in which the particles are maintained in suspension and evenly coat the inside and outside of the strand, including gaps between individual fibers;

FIG. 6C is a schematic cross-section of a prepreg resulting from complete drying of the emulsion of FIG. 6A, in which particles evenly coat the outside of the strand and gaps in between individual fibers;

FIG. 6D is a schematic cross-section of a prepreg having a flexible coating formed on the surface of the strand to contain the particles within the prepreg;

FIG. 7A is a schematic cross-section of a porous article;

FIG. 7B is a schematic cross-section of a prior art porous article having a polymer matrix coating only the outer surface of the article, as a result of exposure to an unstable emulsion;

FIG. 8A is a schematic cross-section of an embodiment of a prepreg of the present invention, in which a porous article exposed to a stable emulsion provides an even distribution of particles on the outer surface and within pores of the article;

FIG. 8B is a schematic cross-section of an embodiment of a composite of the present invention, resulting from fusion of the particles in the prepreg of FIG. 8A;

FIG. 9 is a schematic cross-section of an embodiment of a composite of the present invention, in which a core layer comprising scrap fibrous material within a polymer matrix is sandwiched between two outer layers of fibrous sheets;

FIG. 10 shows a photocopy of a photograph of a wood chip/glass fabric/chunk laminate with a 24 oz woven roving skins; and FIG. 11 shows a photocopy of a photograph of composite laminate boards comprising waste glass fabric and wood chips.

DETAILED DESCRIPTION

The present invention relates to fiber composites having a high-quality polymer matrix that is substantially void-free, resulting in a composite of improved strength and toughness. Generally, the composites of the present invention are formed by fusing polymer particles present in gaps between individual fibers. This method avoids the need for polymer melt flow and the destructive aspects resulting from the conditions required to cause melt flow. Upon fusion of the particles, a matrix embedding individual fibers results, where the matrix is substantially free of voids and defects. The present invention also relates, in part, to new composite structures. Such new composite structures can be formed with a wide variety of fibrous materials, including those formed from cheap surplus or scrap materials.

An advantageous feature of the present invention involves the ability to impregnate gaps between individual fibers of a fibrous article or strand with a polymer resin without relying solely on melt flow. Previous, strategies to impregnate fibers with polymer resins, such as thermoplastics, involved forming a melt and applying high pressure to force the polymer into the fiber cavities. High pressures are necessary, as thermoplastic melts are typically highly viscous fluids. Once the melt has impregnated the cavities, however, the melt can continue to flow, resulting in creation of unwanted voids or spaces in the resulting matrix. In certain cases polymers capable of dissolution in organic solvents can be introduced into the fibers as a solution. However, subsequent removal of the solvent can also lead to the formation of unwanted voids and defects.

As an alternative to forcing polymer melts through fibrous articles, prepregs in the prior art have incorporated polymer particles. But for many polymers, particles obtained by common grinding methods do not have a sufficiently small size to impregnate the gaps between individual fibers. Thus, these prior art prepregs have a coating of particles outside fiber bundles, as opposed to impregnating individual fibers.

FIG. 1 shows a schematic cross section of a prior art thermoplastic prepreg 10 comprising thermoplastic particles 12, fibers 14, and gaps 16 which exist between the fibers 14. Fibers such as graphite, glass and ordered polymer fibers generally have an average diameter ranging from 7 $\mu$m to 20 $\mu$m in diameter. Thermoplastic particles 12 are usually prepared by dry grinding methods which lead to average particle sizes of 10 $\mu$m to 50 $\mu$m in diameter. Thus, the size of gap 16 is typically smaller than the diameter of particles 12 in prior art thermoplastic prepregs. Due to these large particle sizes, thermoplastic particles 12 are incapable of impregnating into gaps 16 between fibers 14 in a facile manner.

FIG. 1 highlights the small gap sizes and difficulty in impregnating these gaps with polymer melts. High pressures are needed to achieve such impregnation, as discussed previously. Such pressures can add to already existing prepreg and composite processing problems. In addition, even if impregnation between individual fibers has been successfully achieved with polymer melts, subsequent polymer melt flow can create detrimental voids.

Thus, one aspect of the present invention provides method of forming a composite. The method involves providing a strand which comprises a plurality of fibers. "Strand" is also referred to in the art as a "tow" or a "yarn" and comprises a union of individual continuous fibers produced by spinning or finishing process or other processes, as is well-known in the art. The strand can be a single strand, supplied by a roll, or the strand can be positioned within a fibrous material (e.g. a plurality of woven, stitched or non-woven strands) such as a fabric or a tape. The fabric can be a heavy weight fabric with weights of at least 5 kg/m$^2$.

In the present method, the strand is exposed to a stable emulsion including polymer particles. Certain prior art techniques for coating strands involve the use of emulsions. However, the reported emulsions require continuous stirring to prevent the settling of particles. In contrast, the present invention provides a "stable emulsion", referred to herein as a suspension of polymer particles in a solvent, i.e. a "dispersant", in which the particles remain in suspension when free of exposure to agitation conditions, such as stirring or shaking. The emulsions of the present invention can be stable for as long as 1 day or several days, weeks or even months.

FIG. 2 illustrates the disadvantageous effects in forming a composite through an emulsion process if an unstable emulsion is used. FIG. 2 shows a schematic cross-section of a portion of a strand 50 comprising a collection of continuous fibers 52. FIG. 2A shows strand 50 immediately upon exposure to an unstable emulsion 54. The emulsion on strand 50 is no longer exposed to agitation conditions such as continuous stirring or shaking. Thus, particles of emulsion 54 settle and deposit on strand 50 as a layer 56 of loose powder. FIG. 2B shows a partly dried strand in which layer 56 grows denser as more particles settle from suspension. Some of the powder may penetrate outer fibers 52a of the strand, provided the particle size is sufficiently small, but due to the settling of the powder, the particles lose mobility to penetrate inner fibers 52b of strand 50. FIG. 2C shows a final prior art 58 prepreg in which a dense layer of particles 56 coats the outside of strand 50 and fails to penetrate below the outer surface.

Thus, from FIG. 2, it can be understood that with a stable emulsion, particles can be maintained in suspension even when adhered to a strand, i.e. when not exposed to agitation conditions. Particles in a suspension have sufficient mobility to penetrate to fibers of the strand and substantially fill gaps between individual fibers. In some cases, after initially exposing the fibers to the stable emulsion followed by penetration of particles into the strand, additional re-exposure steps may be required to provide sufficient amounts of polymer particles to coat and substantially fill in the gaps of the innermost fibers.

Thus, an advantageous feature of the present invention allows the individual fibers to be impregnated with polymer particles in the absence of high pressures, thus avoiding certain prior art methods of forcing polymer melts under pressure into the gaps between the fibers. The strand can be exposed to the stable emulsion in any manner that "wets" the strand with a sufficient amount of the emulsion. The exposing can occur by immersing or dipping the strand in the emulsion, spraying the strand with the emulsion, painting the strand, or any other wetting means. Because the particles in the emulsion have sufficiently small dimensions, simply exposing the strand to the emulsion allows particles to impregnate the gaps between individual fibers.

In one embodiment, the stable emulsion is provided by controlling the "solids content" of the emulsion. Polymer particles typically make up the vast majority of the "solids content." An optimal solids content for a particular polymer type can depend on the polymer particle size, viscosity of the dispersant, temperature of the emulsion and/or the presence of other additives such as surfactants or stabilizers. Stabilizers are added to the emulsion to extend the time of stability and are usually polymers that are soluble in the dispersant and thicken the dispersant Generally, the solids content of the emulsion is sufficiently high to maintain a viscous dispersion which inhibits settling of the particles. If the solids content is too high, however, the consistency of the emulsion resembles more of a paste (as opposed to a "cream") and solids can coagulate to larger aggregates, leading to settling. In these embodiments, the stable emulsion of the present invention has a solids content of no more than about 60%. In other embodiments, the emulsion can have a solids content of no more than about 50% or even as low as no more than about 30%. Optimally, the emulsion has a solids content of at least about 5% to about 60%. Depending on factors such as polymer type and fiber type, the emulsion can have a solids content from about 5% to about 50%, from about 5% to about 45%, from about 5% to about 30%, from about 30% to about 60%, from about 30% to about 50%, or from about 30% to about 45%.

In one embodiment the mean diameter of the polymer particles can be used to maintain a stable emulsion. The range of mean diameters for a particular polymer can depend on factors such as solvent viscosity, e.g. more viscous solvents can suspend larger particles and thus the range is greater. Desired particle diameters will also depend on other factors besides maintaining a stable emulsion, such as the diameter of the individual fibers to be used in the composite (see discussion of FIG. 5) or any of the other factors mentioned above. In another embodiment, the particles have an average diameter of less than 5 $\mu$m, preferably less than about 1 $\mu$m, more preferably less than about 0.5 $\mu$m, and more preferably still, less than about 0.25 $\mu$m.

The solvent for the emulsion can be water, an organic solvent, miscible mixtures of water and an organic solvent(s), immiscible mixtures water and an organic solvent(s), e.g. water-in-oil or oil-in-water emulsions, miscible mixtures of organic solvents, or immiscible miscible mixtures of organic solvents. The viscosity of the solvent can be a factor in the stability of the emulsion.

In one embodiment, a stability of the emulsion is enhanced by additives such as surfactants. Surfactants are known to provide a stable emulsion due to the formation of micelles in conjunction with the polymer particles. The surfactant can be ionic or non-ionic. Most commonly, a surfactant is anionic i.e. having a negatively charged head group attached to a non-polar or hydrophobic backbone tail. Examples of negatively charged head groups include sulfates, sulfonates, sulfosuccinates and phosphates. Examples of an ionic surfactant includes sodium lauryl sulfate and sodium dodecylbenzene sulfonate. Example of a non-ionic surfactants include polyoxyethylenated alkylphenols such as the Triton® X series (polyoxyethylenated octylphenol) and the Triton® N series (polyoxyethylenated nonylphenol), both of which can be purchased from Union Carbide.

In one embodiment, the emulsion including polymer particles is provided through emulsion polymerization. Emulsion polymerization can result in polymer particles of small sizes, typically between 0.1 $\mu$m to 0.25 $\mu$m, and these polymers have high molecular weights of at least 10,000 g/mol. Emulsion polymerization is effected when a water-insoluble monomer is placed in an aqueous solution and allowed to polymerize, where polymerization is initiated by the production of free radicals in the water phase. Thus, the polymer can be any polymer capable of being formed by addition polymerization. In one embodiment, the monomer is a liquid. In another embodiment, the monomer includes a vinyl group. An example of such monomers include acrylic acid and esters, methaerylic acid and esters, styrene, acrylonitrile, vinyl chloride, vinylidene, butadiene and others. Examples of polymers made by emulsion polymerization include polystyrene and acrylonitrile-butadiene-styrene (ABS) copolymers. Other examples include homopolymers or copolymers of -styrene, methyl methacrylate, ethyl methacrylate, methacrylic acid, acrylic acid, methyl acrylate, ethyl acrylate, butyl acrylate, 2-ethylhexyl acrylate, crotonic acid, divinyl benzene, vinyl chloride, vinylidene dichloride, acrylamide, methacrylamide, acrylonotrile, n-vinyl pyrrolidone, butadiene, ethylene, propylene, ethylene glycol dimethacrylate, glycidyl acrylate, glycidyl methacrylate, methacrylonitrile, vinyl pivalate, octyl acrylate.

"Core-shell" polymer particles consist of an inner particle of one polymer/copolymer around which is formed a shell of a second polymer/copolymer and can be made by graft polymerization in an emulsion using any of the above monomers as mixers or in sequence (e.g. AVS, HIPS, ASA).

Reactions other than free-radical additions can be envisioned for emulsion polymerization, such as polymerization from an oil-in-water emulsion. Water-in-oil emulsions also have been used to produce polymer latexes such as polyaniline.

In another embodiment, the emulsion including polymer particles is produced by a method of grinding polymer solids to a predetermined particle size, preferably by a wet grinding method. Predetermined particle size can have dimensions based on factors described herein, e.g. emulsion stability, polymer type, fiber diameter, etc. Polymers such as polyketones, polyesters, polyamides, polysulfones, polysulfides and others can be ball mill ground to a stable emulsion by various methods known in the art. Other methods of grinding include the use of air mills, cryogenic grinding, wet milling and ultrasonic disintegration. Wet grinding methods such as ball-milling gives the opportunity for introducing mineral or metallic materials for the modification of the properties of the final composite material.

In another embodiment, the emulsion including polymer particles can be prepared by precipitation from solution. The method of making these polymers is described in U.S. Pat. Nos. 3,993,843 and 4,222,918, both patents being hereby incorporated by reference in their entirety.

Other additives can be provided in the emulsion, such as pigments for coloring, flame retardants, inert fillers for cost reduction such as bentonite, metallic fillers such as silver for the control of conductivity or fillers such as aluminum or silica powder for the control of thermal expansion. If these additives are present in the emulsion as solid particles, preferably the particles have similar dimensions as the polymer particles, or even smaller dimensions. Of course, it is understood that the additives should not cause destabilization of the emulsion.

In one embodiment, the additive can comprise ceramic and metallic particles. A stable emulsion can carry a significant amount of ceramic or metallic particles into bundles of suitable fibers. An intermediate stage, containing the metallic or ceramic matrix pressed together with the polymer, gives a nearly net sized preform for the final stage where the polymer is removed by burning off the polymer and the matrix is fused together. By this embodiment, it is possible to prepare ceramic or metallic composites. This embodiment overcomes many of the problems of oxidation and contamination in handling very fine powders of ceramics or metals.

In this aspect, the method also comprises allowing the polymer particles to penetrate gaps between individual fibers. This aspect involves the formation of a "prepreg," which refers to a precursor of a polymer matrix (i.e. the polymer particles) impregnated into the fibrous material. The resin precursor can be a high molecular weight polymer and/or can include a monomer or oligomer. Subsequent treatment of the prepreg results in formation of the matrix (for example, see discussion on fusing particles below).

In one embodiment, the penetration occurs to the extent that polymer particles substantially fill gaps between the individual fibers of the strand. "Substantially fill gaps" refers to at least about 90%, more preferably at least about 95%, and even more preferably at least about 99% of a gap between individual fibers is filled with polymer particles. In one embodiment, substantially each fiber in the strand is coated with polymer particles, and preferably gaps between substantially each fiber in the strand is substantially filled with polymer particles. In reality, each and every fiber in the strand may not be coated and completely impregnated by particles of a polymer and thus "substantially each fiber in the strand" refers to coating at least 50% of the fibers, preferably at least 80% of the fibers are individually coated by particles, more preferably at least 90% of the fibers are individually coated by particles, still more preferably at least 95% of the fibers are individually coated by particles, and even more preferably still at least about 99% of the fibers are individually coated by particles.

After the strand has been exposed to the emulsion, the strand can be dried. Typically, the drying can be performed via an air-drying process or under low temperatures. If only drying is to be accomplished (as opposed to drying and fusing), the drying is preferably performed below the minimum film-forming temperature (MFT, see below). The drying step allows for the removal of excess solvent or water while maintaining the particles inside the strand.

Because drying results in a removal of solvent from the strand, empty gaps between the fibers may result. Thus, after one or more exposure steps, it may be desirable to coat the outside of the strand with a sufficient amount of polymer particles such that surface tension can pull polymer from outside the strand into the inner fibers of the strand.

After a sufficient amount of the polymer particles have been incorporated into the strand, the method further comprises fusing the particles in the coating to form a polymer matrix around substantially each individual fiber. The matrix is substantially void-free because simple fusion between particles in contact with neighboring particles avoids the reliance on melt flow. There is no actual flow needed to make a composite, as was necessary in the prior art. Thus it is possible that a very high molecular weight polymer can be used to make a composite where the polymer is substantially non-flowing, such as polymers having molecular weights of at least 5,000 g/mol and preferably at least 10,000 g/mol. Such a situation exists with polytetrafluoroethylene where a solid polymer is made by sintering powder together at high temperatures.

In one embodiment, the particles are fused by applying an elevated temperature to the particles. The temperature is typically at least 125° C. in one embodiment the temperature is no more than 175° C. In another embodiment, the particles are fused by applying a pressure to the particles, typically pressures of at least 50 psi and preferably no more than 250 psi. In one embodiment, both elevated temperatures and high pressures can be applied to fuse the particles.

Many polymer emulsions fuse as a continuous film if dried above a temperature known as the minimum film-forming temperature (MFT). The MFT is related to the glass transition temperature ($T_g$) of the polymer. Typically, MFT is less than the $T_g$ and more preferably between 10° C. to 20° C. less than the $T_g$. For example, a polymer has a $T_g$ of at least 80° C. and hence a high MFT of at least 60° C. Curing below the MFT results in a powder which can be easily lost from the prepreg. In one embodiment, the polymer has a $T_g$ of at least 50° C. and more preferably at least 80° C.

In one embodiment, the drying step is sufficient to cause the polymer to fuse, e.g., if the temperature of the latex is above the minimum MFT, the thermoplastic particles will fuse during the final stages of drying.

Fusing at lower temperatures may also be induced by adding small amounts of a low $T_g$ polymer by any method known in the art. In one embodiment, the MFT can be lowered by using a coalescent or adding a second polymer with a low MFT. Coalescents are a well-known in latex coating. A small amount of solvent is emulsified and added to the latex and has the effect of lowering the MFT during the critical film-forming stages. Examples of solvents suitable for styrenics and acrylics are 1-phenoxy-2-propanol (Dowanol DPH) and Di-propylene butylene glycol (Dowanol DPNB). These are blended with water and 1% Aerosol OT at 50% until emulsified. Sufficient emulsion can be added to make the solvent content between 1 and 3% in the latex.

By careful process control, the outside of a tape or fabric prepreg can be brought above the MFT while the core of the prepreg stays below MFT. The prepreg thus formed has a powder inside the yarns and a fused layer on the outside of the yarn. This prepreg has flexibility and formability but does not lose resin during handling. Thus, in one embodiment, an outer layer or outer layers of the prepreg is fused where the fused outer layer(s) contains an inner core of unfused polymer particles This embodiment provides better fusing properties, for example when making a thick heavy preform.

Some emulsion polymers can incorporate cross-linking comonomers to improve the final polymer properties. Such copolymers can be used to make composites by the invention even though the crosslinker may have reacted before the temperature is high enough for pressing.

Even linear thermoplastics can have high melt viscosities such that flow or spreading of the composite becomes difficult. Low viscosity thermosets allow the yarn bundles to flatten during pressing when those yarn bundles are large— as in heavy weight fabrics. With prepregs of the invention, the yarns will not flatten when pressed between parallel sheets. A pressure distributing medium is required to ensure that pressure is maintained on all parts of the laminate. This distributing medium can be a layer of rubber. A thickness of 0.75 to 1.5 mm of silicone rubber can be used for glass impregnates with weights up to 34 oz/yd$^2$. A layer of unreinforced polymer can also be used and would have the added advantage of providing a finished side to the laminate.

In one embodiment, the polymer can be a high viscosity polymer having a viscosity of at least 5,000 centipoise, preferably at least 10,000 centipoise, more preferably at least 50,000 centipoise, still more preferably at least 100,000 centipoise and even more preferably from 100,000 to 20,000,000 centipoise. At these viscosity levels, the polymer is incapable of significant flow when incorporated as a matrix in the composite, i.e. the polymer is a non-flowing polymer. A non-flowing polymer is desired to maintain the integrity of the polymer matrix in the composite. The polymer can be a homopolymer or a copolymer, such as a random copolymer or a block copolymer, and can exist as a syndiotactic or stereotactic form of these polymers as well as blends or alloys of any of these polymers.

The viscosity of thermoplastics varies with shear rate decreasing from a near constant value at low shear. Viscosity at low shear rates is usually referred to as the Newtonian viscosity. This is conveniently measured in a capillary viscometer using a die 1 mm in diameter and 8 mm long, the melt viscosity being determined at a shear stress in the range 1000–10000 $N/m^2$. Melt viscosities are measured at a convenient temperature above the melting temperature and below a temperature at which degradation of the polymer occurs. Melt viscosities range from 5 to 20,000 Newton seconds/square meter, and more typically range from 100 to 20,000 $N/m^2$.

In one embodiment, the polymer is a thermoplastic. Any thermoplastic can be used in the present invention, particularly those that are a solid at room temperature and have a glass transition temperature ($T_g$) above room temperature. Examples of thermoplastics include polyolefins (e.g. polyethylene, polypropylene), polystyrene, polyamides (e.g., nylons), polyimides such as thermoplastic polyimides, polypropylene oxide, polyphenylene oxide, acrylonitrile-butadiene-styrene (ABS), polyacetals, polyesters, polyphenoxies, polyacrylic esters, polyvinyl esters, polyvinyl halides, polysiloxanes, polyurethanes, polyethers, polysulfides, polycarbonates, polybutylenes polyarylates, acrylic polymers, cellulosics, fluoroplastics, polyketones and ketone based resins (e.g. PEK, PEEK, PEKEKK), nitrile-based polymers, polymethyl pentenes, polyphenylene sulfides (PPS), polypthalamides, polysulfones, polyethersulfones (PES), polyinylidene chlorides, polyvinyl chlorides (PVC), ethylene-vinyl acetate copolymers (EVA), high impact polystyrene (HIPS), acrylonitrile-styrene-acrylic ester copolymers (ASA) and styrene-acrylonitrile copolymers (SAN).

In one embodiment, the polymer is not a true thermoplastic, i.e., further chemical reactions are required to form the final polymer. The thermoplastic may contain a crosslinking agent in the polymer chain such as a carboxyl group in an acrylic copolymer or it may be formulated with an external crosslinker such as a phenoxy with a multivalent amine. Whenever and however the polymer is crosslinked, the invention can still be applied to penetrate the strand with the corresponding polymer particles and to subsequently fuse these particles into a matrix. If the polymer is crosslinked, preferably the polymer is incapable of flow (i.e., non-flowing) when incorporated as a matrix in the composite.

It is to be preferred that the crosslinking reaction takes place after the latex is dried and is deposited as a powder between the fibers and takes place simultaneously with the compaction and fusion into a composite matrix.

Some crosslinking mechanisms allow for an external crosslinker e.g. amines used for crosslinking epoxy moieties. While the crosslinker can be added along with the monomers when the latex is polymerized, it may also be added at the coating step. For example an amine could be added to the latex before coating. The amine would coat the particles after drying. During the melting and compaction stage that amine would react with glycidyl, carboxylic acid or other comonomers in the polymer to produce crosslinking in the polymers and thus improve the heat resistance and other properties of the matrix. Crosslinking monomers that can be added to vinyl systems include acrylic acid, methacrylic acid, N-N dimethylaminoethyl methacrylate, t-butylaminoethyl methacrylate, 2-hydroxyethyl acrylate, 2-hydroxyethyl methacrylate, 2-hydroxypropyl acrylate, 2-hydroxypropyl methacrylate, acrylamide, methacrylamide, glycidyl methacrylate, ethylene glycol dimethacrylate, 1,3 butylene glycol dimethacrylate and allyl methacrylate. This list is not exclusive and many other monomers and their reactions can be used to effect crosslinking.

Crosslinked thermoplastics blur the line between thermoplastics and thermosets. Many thermosets pass through a thermoplastic stage in their progression to a thermoset. The most commonly used thermoset, polyester, is a solution of a polyester in styrene that cures in fact by mass polymerization of styrene. Crosslinking occurs through the multifunctional vinyl-containing monomers incorporated in the polyester portion of the mix. Vinylester systems are similarly a vinyl ester of diglycidyl ether of bis-phenol A dissolved in styrene. To use these thermosets in the invention, the polyester or vinyl ester resin mix is stirred with water and a surfactant to produce an emulsion. This emulsion is polymerized by the methods well-known in the art such as the addition of sodium persulphate to the latex. Polymerization is halted by cooling or other means at a point where the MFT is in the range prescribed previously i.e. above 50 deg. F. and preferably above 100 deg F. As this point is first reached, the polymer in the latex is still a fusible thermoplastic but if the reaction is continued too far the gel point will be reached and the particles of the latex may become infusible. Coating a fabric with a latex reacted to the extent described creates a prepreg that can be heated and consolidated into a composite. Homopolymerization or the use of an external catalyst (e.g a peroxide) reacts this matrix polymer into the thermoset form that is normally seen. This process (going through the partially reacted latex form) has the advantage of eliminating many of the problems of thermosets. The liquid phase is eliminated because the polymer is now introduced as a solid particle. The thickening step is eliminated because it is carried out before coating. The pressurization step to close down void is eliminated in favor of the fusion/consolidation step with all the advantages previously discussed for thermoplastics. The liquid-on-fiber process of the prior art is difficult and takes a long time to process or has a level of voids inherent in it. The invention is faster and more certain in its results.

Other thermoset systems can be also be used in the same manner to produce composites of the invention. The requirements are a) the precursor resin system is emulsifiable in water, b) there is a curing agent soluble in the water phase or oil phase that will react the system to a branched thermoplastic c) that same curing agent or another will complete the reaction beyond the gel point after coating. Such chemistries already exist for epoxy systems and others.

Examples of fibers that can be used in the present invention include glass, carbon, graphite, polyaramid, nylon, polyester, polypropylene, polyethylene. Natural fibers include flax, hemp, jute, ramie, kenaf, coir, bamboo, agave, sisal, cotton, abaca, manila hemp, and henequen. Ordered polymer fibers can also be used, i.e. rigid rod polymers which are extruded into useful fibers by spinning from acidic solutions. Examples of ordered polymer fibers include Kevlar® and Twaron® polyaramide, polybenzimidazole, polybenzoxazole and polybenzbisthiazole fibers.

FIG. 3 shows, as an embodiment of the present invention, a schematic cross-section of prepreg 20. Prepreg 20 comprises fibers 24 and polymer particles 22, where polymer particles 22 have a sufficiently small diameter that allows particles 22 to impregnate and substantially fill gaps 26 between individual fibers 24.

FIG. 3 also provides an illustration on how prepreg 20 can be subjected to conditions of heat and/or pressure that allow the particles 22 to be fused together to form a continuous polymer matrix to embed the individual fibers 24. By the use of prepreg 20 comprising individual fibers 24 coated with polymer particles 22, a matrix can be achieved that is substantially free of voids and/or other defects. A defect-free matrix cannot be accomplished when a polymer melt is forced at high pressure in the gaps between the individual fibers due to continuing flow of the matrix once the melt has impregnated the fibers.

FIG. 4 shows, as an embodiment of the invention, a schematic expanded cross-sectional area of a fiber bundle. This illustration (in conjunction with FIG. 5) provides a basis for determining maximum particle diameters for penetrating fibers, based on fiber diameter. As discussed above, applicable particle diameter ranges based on fiber diameter are one factor in preparing the stable emulsion. By assuming a theoretical cubic packing arrangement 30 of fibers in the bundle and knowing the average fiber diameter 31, a theoretical gap dimension 32 can be calculated. In reality, the gap dimensions are variable, with some dimensions being greater or smaller than the theoretical size.

FIG. 5 is a graphical representation of the gap between the fibers in a composite. In FIG. 5, the abscissa represents the volume fraction if occupied by fiber in the bundle having a cubic close-packed arrangement as in FIG. 4 and the ordinate represents the gap size in micrometers ($\mu$m). In one embodiment, the bundle has a fiber volume of 40 to 70% in the final composite. The theoretical minimum gap, g, between fibers is plotted in FIG. 5 for typical fiber sizes in a composite (see gap dimension 32 of FIG. 4). For example, for a fiber diameter of 20 $\mu$m and a volume fraction of 0.5, the theoretical gap would be approximately 11 $\mu$m. Even for a volume fraction of as low as 0.4, a fiber having a diameter of 20 $\mu$m will have a theoretical gap of only 17 $\mu$m, less than the typical prior art particle dimensions of 20 to 50 $\mu$m and thus preventing penetration of particles through these gaps.

From FIG. 5, it can be seen that desired particles to be used in the present invention have a mean diameter of less than 0.25 times the mean fiber diameter to allow facile impregnation of particles through the gaps. Of course, factors other than particle size, e.g. to maintain a stable emulsion, are taken into effect when determining optimal particle diameters.

The success of resin transfer molding and resin infusion processes for thermosets indicates that the flow of these low viscosity resins are helped by surface tension or "capillary" forces. When a low viscosity resin is injected into a tightly packed preform of yarns, there is no pressure at the front of the resin as it advances through the preform. Preforms are completely infused by these thermosets despite the lack of pressure. At the size of gap indicated in FIG. 5, capillary forces would be significant to help introduce a liquid epoxy thermoset into the gap. In fact, the smaller the gap, the higher the capillary force, and these capillary forces may be helping the impregnation of thermosets into prepregs.

Because the viscosity of a melted thermoplastic is three orders of magnitude higher and the surface tension of the melt will be very low because of the high molecular weight, capillary forces are most likely insignificant for thermoplastics. Thus thermoplastic composite fabricators (of the prior art) have previously relied on external pressure to force the resin into the fiber gaps. The gap between fibers is typically very small and would require high pressures to obtain significant flow of the polymer melt through the gaps. These high pressures could in fact force the fibers to close up on each other and further limit the penetration of the yarns by the resin. External pressures are typically higher for prior art thermoplastics—up to 500 psi for molding. Only thermoplastics with lower viscosity melts (polypropylene, polyamides, polyesters and special grades of polyether ketone as in U.S. Pat. No. 4,549,920) have had limited success in composites.

FIG. 6 schematically shows the formation of an embodiment of a prepreg of the present invention. FIG. 6A shows strand 60 comprising fibers 62 immediately after exposure to stable emulsion 64. In contrast to prior art processes (e.g. schematically illustrated in FIG. 2), FIG. 6B shows stable emulsion 64 concentrating evenly inside and outside the yarn at the start of drying. When drying is completed (FIG. 6C), polymer particles 66 are distributed evenly throughout the strand and substantially fill the gaps between individual fibers 62. FIG. 6C represents an embodiment of a prepreg of the present invention. Optionally, heating the prepreg in FIG. 6C above a MFT can provide a coating 68, as shown in FIG. 6D to contain particles 64 within strand 60. Coating 68 can comprise a flexible skin. The particles can then be fused at any desired time.

The strand can be provided in a fibrous sheet article made of any of the fibers mentioned herein. The article comprises a plurality of strands, each strand comprising a plurality of fibers. The invention can allow substantially each fiber to be embedded in a polymer matrix derived from fused polymer particles.

In one embodiment, the prepreg is provided as a fabric, such as a tape. In the prior art, because large particles were only attached to the surface of the fiber bundles, the thickness of prepregs was restricted to what could be filled by the outside layer of resin. An advantageous feature of the method of the present invention is that the particles can penetrate very thick layers of fabrics (e.g., up to 50 oz/sq. yd in weight) because of the capability of the polymer particles to impregnate between individual fibers and the ability of the dispersant (e.g. water) to penetrate and wet the fibers, thus carrying the particles inside the strand. For heavy fabrics, a single ply of fabric can be formed, impregnated and molded to make useful moldings. Stitch-locked glass fabrics are in common use in the boating industry and these are economical. Glass fabrics with low-cost lattices can provide moldings that compete in price with many other materials.

Heavy fabrics can also be impregnated on a continuous basis and formed into sheets. If the process is modified with a hot nip roll before the cold nip roll, the process can produce continuous sheet materials from heavy glass fabrics or other fiber forms. Rather than rolling up the sheet, it can be cut to length with a flying saw. The sheet material is useful as flat sheet stock. Because of the thermoplastic matrix, however, it can be reformed with heat into many more useful products.

FIGS. 7 and 8 contrast the difference in forming a composite with porous articles when an unstable emulsion (FIG. 7) is applied versus a stable emulsion (FIG. 8). FIG. 7A shows a schematic cross-section of a porous article 70 having pores 72. In a similar manner to the process described in FIG. 2, an unstable emulsion applied to porous article 70 causes particles to settle on the surface of porous article as a layer of loose powder. Subsequent drying and fusion of the particles results in the formation of a polymer matrix 74 only on the outer surface of porous article 70 (FIG. 7B).

In contrast, FIG. 8A shows porous article 80 having an outer surface and pores evenly coated and substantially filled with particles 82. This can only result if article 80 is exposed to a stable emulsion in which particles 82 have sufficient mobility, upon adherence to article 80, to penetrate the pores. Fusion of the particles 82 ultimately results in the formation of a polymer matrix 84 substantially filling the pores of article 80.

The article is not provided as a mixture of loose particles. Substantially rigid refers to a solid article, although it may be malleable. A portion of the polymer particles penetrate substantially all ends of individual fibers in the fibrous segments.

In the prior art wood is used with thermoplastics only as wood flour which functions as a low cost filler. This is because the only viable process for thermoplastics is extrusion or injection molding and both these processes cannot accommodate fillers of more than microscopic size—i.e flours and powders—because the process would break up larger particles. Reference 1 describes many processes for using wood in composite panels where the wood is in larger size than Reference 1. The fibrous segments of the invention could be any of the wood fiber forms mentioned therein that are larger than a powder. Of particular interest are the products known as flakeboard, particle board, chipboard or oriented strand board (OSB) where the particles are macroscopic in size from 1 mm up to 100 mm in length. (The Estrand of the OSB product is a chip or sliver or wood shaved from a wood pole and not to be confused with the fiber strand or yarn mentioned earlier). The latex penetration process of this invention can be substituted for the phenol-formaldehyde, urea-formaldehyde or polyurethane adhesives of the prior art with the result that products of superior toughness can be produced. However, in the prior art the thermosetting adhesive is kept at the minimum required to effect adhesion between the particles because of 1) the condensation reaction of cure and the need to remove steam and VOCs (volatile organic compounds) from the panel 2) the brittle nature of PF and UF resins and 3) the cure shrinkage of the resin. With this invention more polymer can be added to the wood particles to make a denser product with more strength and stiffness. Some polymer can be added as latex on the surface of the particles and some can be added as plastic pellets to the forming process shown in figure 10-6 of reference 1 just prior to pressing. For construction the polymer will preferably be of low flammability. Fabrics of glass or other fiber treated with latex according to the invention can also be added to the preform before pressing to add even more strength and stiffness to the board. The wood-based particulate composite board of the invention will thus be a stronger material with more structural uses than the prior art.

Much wood is also used as a veneer based composite, i.e. plywood, where layers of wood are bonded together to make a sheet or board product with superior stability, stiffness and strength to the board that could be sawn from a log and usually of a much larger size than the trunk of a tree would yield. The adhesives used in the prior art are subject to the same limitations as discussed above in regard of particulate wood composites. The process of the invention, i.e. coating with a latex and drying below the MFT, can be applied to the veneers and cores used in any plywood but the invention also adds the possibility of laminating reinforcing layers of fabric into the plywood to produce a stiffer and stronger product than has been available before. The fabric layers will typically be glass fiber with the same latex as has been used to infuse the pores of the veneer with polymer particles or a compatible polymer. An external layer of fiberglass fabric or mat can be added to the laminate to confer some flame retardance and further flame retardance can be gained by adding any of the compounds well known in the art such as phosphates or aluminum trihydrate which produce steam or other non-flammable gases on exposure to flame. U.S. Pat. No. 4,443,520 describes a coating composition for conferring flame retardancy that consists of a film-forming latex and aluminum trihydrate. An outside ply of glass mat or fabric is prepared by coating with a non-film forming latex containing a suspension of aluminum trihydrate according to U.S. Pat. No. 4,443,520 and dried below the MFT. This ply is bonded to the plywood (of conventional or new art manufacture) with heat and pressure.

Another aspect of the present invention provides an article comprising a plurality of fibrous segments. "Fibrous segments" refers to portions, pieces, chips, etc. of fibrous articles, synthetic or natural. Fibrous segments can comprise any fiber described herein. In this aspect, polymer particles are mixed with the fibrous segments such that the entire article is substantially rigid. The article is not provided as a mixture of loose particles. "Substantially rigid" refers to a solid article, although it may be malleable. A portion of the polymer particles penetrate substantially all ends of individual fibers (i.e. the tips of the fibers) in the fibrous segments. The penetration can occur to a depth equaling the sum of the diameters of at least several particles. Ideally, the particles should penetrate at least outer fibers of the segments and in some instances, penetrate the entire segment.

An advantageous feature of the article of the present invention allows the incorporation of inexpensive scrap or surplus materials in the composite, such as scrap fabrics and/or yarns. Embedding these scrap fabrics to the extent that fiber ends are penetrated by a polymer matrix provides a strong composite material made from cheap precursors.

"Scrap" generally refers to second hand materials, waste materials, surplus materials or shavings. For example, many fabrics are made to exacting specification for a desired end use. If the fabric is outside of the specification, it becomes scrap which is then chopped into pieces of irregular shapes. The dimensions of these scrap materials can range from 1 cm to as long as several inches (or several centimeters). Because of the long lengths of continuous fiber present in the scrap material, a composite comprising scrap materials can be almost as stiff and strong as a pure fabric composite. Moreover, random orientations of the fibers provide a quasi-isotropic material. Many types of fibers in scrap materials can be envisioned so long as they are capable of forming lamellae.

The use of scrap fibrous materials provides economic advantages as much of these materials would have been otherwise disposed of. Scrap glass fabric is readily available from other producers of glass fabrics. Several million pounds of other fabric waste is made annually from natural and synthetic fibers. Some of this fabric waste is resold as rags but much of this waste is disposed. Thus, these components are very inexpensive.

Examples of scrap fabrics include nylon, Kevlar®, polyaramid, glass fibers, cotton, Sisal, and polyester fabrics. Other fibrous materials include wood scrap materials such as biomass, chips, bole chippings, bark chips, wood flakes, deconstruction waste, wood churnings and shavings, kindling, carpentry scraps, cut-offs and sawdust. Types of wood that can be used include Aspens, Southern yellow pine, white birch, red maple, sweet gum, yellow polar, cottonwood, deal, oak, maple, douglas fir and hemlock. Wood fiber can be produced deliberately, e.g. flakes in oriented strand board, or as the result of processing wood, e.g. sawdust.

Other examples of fibrous materials include glass, carbon, graphite, polyaramid, nylon, polyester, polypropylene, polyethylene. Natural fibers include flax, hemp, jute, ramie, kenaf, coir, bamboo, agave, sisal, cotton, abaca, manila hemp, and henequen.

The fabrics can be provided as woven fabrics such as plain weaves, satin, crows foot and twills. Examples of non-woven fabrics include chopped, strand mats, wet laid non-woven fabrics and air spun fabrics. Non-woven fabrics can have oriented fibers such as stitchlocked fabrics, for example, Knytex fabrics from Owens-Coming.

The composite can incorporate further materials along with the fibrous segments, including thermoplastic scrap, and metallic or ceramic particles. Examples of thermoplastic scrap include regrind, flake, floor sweepings and contaminated pellets.

The composite can further comprise porous materials, in which the pores are substantially filled with the polymer particles. Consequently upon fusion of the particles, the pores are filled with a polymer matrix.

In one embodiment, the present invention comprises a composite in which the previously-described article comprises a core section. The composite comprises outer layers of a fibrous sheet which sandwich the core. The outer layers help contain the various components of the core to provide a substantially rigid composite.

FIG. 9 shows an example of a composite of the present invention incorporating scrap fibrous material. Composite 90 comprises outer layers 92 of a fibrous sheet sandwiching core 94. Core 94 comprises polymer particles 96 mixed with a plurality of fibrous materials 98a and 98b which can include wood chips or chopped glass fabrics or any of the materials described above. The polymer particles 96 surround and embed materials 98a and 98b. In an enlargement of fibrous segment 98a, particles 96 penetrate ends of fibers 99.

Thus, the polymer particles intimately integrate with the fibrous segments such that a resulting matrix derived from the fused polymer particles also penetrates the individual fibers in the fibrous segments.

As an example of the composite of the present invention, lumber chips, shavings and wafers larger than ¼ inch from Bio-Mass, bole chippings, scrap lumber and other sources are treated by coating with a polymer latex, such as a polymer with a $T_g$ above 100° F. The wood chips are dried at room temperature or at an elevated temperature which does not cause film-forming. Chunks of scrap glass fabric or glass mat are treated with the same polymer and dried in the same manner. The dried wood chips and glass fabric are added to the cavity in a press. The treated wood and glass may be layered or it may be mixed. Layers of continuous glass fabric—also treated—may be added to the top and bottom of the laminate. The whole construction is compacted with pressure and heat to fuse the thermoplastic coatings on the components. Laminates of this type are shown in FIG. 10.

Alternatively, organic-fiber based fabric scraps such as polyester or nylon fabric scrap can be treated with latex and dried. This material can be used on its own or with glass fabric chunks and wood chips to form a laminate. Plastic chips, pellets or regrind may also be added to the mix to make a useful panel.

Alternatively, fiber, wood and plastic materials can be added on a continuous basis and the whole mixture can be pressed in a continuous press to form sheet.

Decorative and functional layers can be added to the basic construction of any composite described herein.

Wood veneer can be treated with latex and added as outside layers before pressing so that a sheet is formed with wood faces.

Intumescent graphite veil can be added to the outside of boards made by the process to confer flame inhibition.

The current process for waferboard and oriented strand board (OSB) uses phenolic or urethane adhesives and only uses enough to bond the wood pieces together. This is because the adhesive is applied from solution and the solvent is difficult to remove. The crosslinked adhesives of the current art are brittle and would not form a good matrix. An embodiment of the present invention provides a modification of the OSB process by using thermoplastic from latex as the adhesive and also as a matrix to form a denser, stronger and stiffer product. In this embodiment, wooden strands are treated with latex and dried. Sufficient solids in the latex or multiple passes ensure that the strands of wood are coated with a generous layer of polymer powder. The strands of wood are oriented and deposited in layers for pressing by the well known methods. Fiberglass chunk or other fiber can be added at this stage to strengthen and stiffen the product further.

Solids pickup[1] is the amount of polymer material left on the strand after the water is dried off. If Wf is the weight of the fabric before dipping and $Wf^1$ is the weight after dipping and drying, the solids pickup can be expressed as the extra weight gained by the fabric $((Wf^1-Wf)/Wf)$ or as the weight of polymer in the final product $((Wf^1-Wf)/Wf^1)$. The solids pick-up of a latex dipping process can be controlled by several factors. The two most important important latex properties controlling pickup are the solids content of the latex and its viscosity. The role of solids content is obvious. As we discuss elsewhere, the latex in the center of the yarn concentrates at the expense of the latex on the outside of the yarn. A higher viscosity latex will leave more latex on the outside of the yarn which will eventually mean more solids inside the yarn. The same polymers which are used as stabilizers, such as polyvinyl alcohol, polyvinyl pyrrolidone and polyacrylic acids, can also function as thickeners to increase the viscosity. If the speed at which the yarn or fabric is dipped is increased then more latex is retained through to the drying stage and the solids pickup is increased. Thus it can be seen that there are many ways to control the solids pickup of the latex dipping process.

Most of the synthetic yarns, such as graphite or glass, are sized to allow handling and weaving. Without size the filaments would chafe and break on handling. Sizes are usually proprietary to the yarn manufacturer and consist of a mixture of oils, waxes, polymers and starches. The size is applied as a dilute solution in water as the yarn is wound. The physical properties of the sizing are important to the final properties of the composite. Many glass yarns have a sizing that that is soluble in vinyl ester or polyester resin or, more specifically in the styrene monomer that is in those resins. In the embodiments and examples given in this application all of the fabrics used were sized for either a polyester or an epoxy system and thus were not optimal for the latex system used. With these wrongly sized yarns the sizing itself can block the passage of the latex into the interior of the yarn. Because of the practice of drying in doffs (large wound packages) glass yarns tend to have a high concentration of sizing at the interior of the yarn. It was found by experiment that better penetration of the yarn in many fabrics was obtained by working the fabric where working consists of passing the fabric over rollers or passing it between rolls with pressure on the rolls. This working breaks the size and breaks apart the filaments so that latex can penetrate all the way into the yarn. In an ideal embodiment of the invention, the sizing will be compatible with latex and will dissolve on contact with water.

In one example a 24 ounce/square yard woven roving was cut into lengths that were laid on a table. A wooden roller of 1 inch in diameter and 2 inches in length (of the kind used by paperhangers) was repeatedly passed over the fabric with 10 to 20 pounds of pressure. Each area of the fabric saw 5 to 10 passes of the roller. The worked fabric was then dipped in a 50% latex of polystyrene (Omnovas Acrygen 4999). The prepreg was air dried. Pressing the prepreg into laminates at 350 degrees F. (175 degrees C.) and 100 psi yielded strong and stiff panels with a high translucency and uniform appearance. Without the working step, this fabric and many others show an inner string in each yarn in a laminate. The string is presumed to be the core of the yarn where size has deposited heavily and locked the filaments together.

These and other embodiments of the present invention will be more fully understood from the examples below. The following examples are intended to illustrate the benefits of the present invention, but do not exemplify the full scope of the invention.

EXAMPLE 1

A styrene/acrylic copolymer emulsion (SA 204 from Para-Chem Inc.) was selected because of its properties. The polymer has a $T_g$ (glass transition temperature) of around 200° F. if prepared by non-emulsion methods. If prepared by emulsion polymerization, SA204 has a $T_g$ of 50° F. The latex has particles around 200 nanometers in size.

Glass fabrics are coated generously by immersing the fabrics in the emulsion and allowed to air dry for 16 hours. Once they are essentially dry, the sheets of prepreg are covered each side with a nylon film. The film coated prepreg is then pressed with a smoothing iron set at 200° F. (93° C.) resulting in a fusing of the particles. (Small latex particles will fuse when taken above their glass transition temperature without melting).

Subsequently, the prepreg sheets are press molded into high quality laminates. Prepreg layers are stacked in the desired orientation and heat tacked together to maintain that orientation. The stack is then loaded into a preheated press at 340–360° F. (171–182° C.). A pressure of 30 to 40 psi is applied to the stack for 2 minutes and the press is then opened for 1 minute to allow any water (steam) to escape. Pressure is reapplied at 100 psi on the stack for 2 minutes. The press is then cooled as rapidly as possible to below 200° F. (93° C.) while maintaining pressure. Once the laminate is cooled, the pressure is relieved.

This process produces stiff, strong laminates with high fiber content. The laminates can subsequently be reshaped by heating to 250° F. (121° C.) and forming to the desired shape. Providing 270° F. (132° C.) is not exceeded and the laminate is not bent too far, the integrity of the laminate is maintained during re-forming. Laminate properties are sufficient for many everyday applications. Woven and stitch-locked fabrics of many styles have been successfully converted into laminates by this technique. SA 204 prepregs are molded at temperatures and pressures which most composite molders can achieve.

The technique described above is a laboratory technique that can be scaled up and automated. The process can be transferred to a textile treater, preferably with a clip type tenter frame. The drying and fusing stages described above can be completed in one operation by passing through a drying oven at 200–300° F. (93–149°). Passing the fused prepreg through a hot nip ensures that air is excluded and the fibers are pushed together. Thin fabrics will make prepregs that can be wound as rolls but heavy fabrics can be sheeted at the end of the treater.

EXAMPLE 2

Table 1 shows the strength properties of example fibrous articles of the present invention. All properties are normalized to 60% fiber by volume. The fabrics in Table 1 are all 18 oz non-woven, stitched glass fabric with equal 0° and 90° fibers (BTI's 1800 style). The fabrics were coated with a thermoplastic latex as described in Example 1. The coating was dried at 250° F. (121° C.) for 30 minutes. Eight plies of the prepreg were then pressed together with each layer laid up in the same direction. The plies were pressed together under 100 psi pressure at 360° F. (182° C.).

TABLE 1

Fiber composite properties

| Thermoplastic type | Manufacturer (Thermoplastic number) | Apparent Flexural Strength (ksi) | Apparent Flexural Modulus (msi) |
|---|---|---|---|
| Vinyl acetate/Acrylic | Air Products, Inc. (Vancryl 989) | 68.8 | 2.66 |
| Acrylic | Parachem (Paracryl 8444) | 71.2 | 3.60 |
| Styrene/Acrylic | Parachem (SA-204) | 77.4 | 2.93 |
| Acrylic | Polymer Latex Corp. (Rohamere 4010D) | 54.6 | 2.70 |

EXAMPLE 3

Continuous graphite fiber tows (strands) are dipped into a bath of SA 204 latex while being spread over a plexiglass bar. The tows are then passed through a tube oven with a wall temperature of 550–650° F. (288–343° C.). The tow spends about 30 seconds in the oven while the water is flashed off and the latex particles are fused. As it exits the oven, the tow is passed through rollers to flatten it to a uniform thickness. Single tows can be treated (towpreg) or collimated groups of tows can form tapes. Tape and towpreg forms of the thermoplastic composite lend themselves to automated molding processes such as hot winding and automatic fiber placement. Sheets of the tape can be stacked in controlled orientations and pressed into useful laminates with the same press cycle as described above for glass prepregs.

EXAMPLE 4

SA 204 and three more latex types are applied to a 0/90 stitched glass fabric of 18 oz weight. The prepreg sheets are dried in an oven at 250–300° F. (121–149° C.) for 30 minutes. Eight sheets of each prepreg type are stacked and pressed to the press cycle as described in Example 1.

EXAMPLE 5

Although the prepregs of the invention will be assembled into preforms and pressed much faster than the competing epoxy systems, moldings with large compound curvatures may be slower to produce because each ply may need some preshaping before placing in the mold. This example eliminates the prepreg step and the forming of those prepregs. This makes the invention even more compatible with existing thermoset processes.

The shape of one side of the mold is approximately reproduced with a permeable material such as woven wire or perforated metal. The other side of the mold is also reproduced in woven wire or similar material that is reasonably rigid but will allow liquids to flow through. Layers of dry fabric (in the sizes and orientations required by the mechanical design) are then laid into the first shell of woven wire. The second shell of woven wire is then placed over the fabric layers such that the fabric layers are trapped between the woven wire layers and are formed to approximate the shape of the final molding. This preform of fabric layers is soaked and coated with a thermoplastic polymer latex. This preform is dried. The entrained polymer is fused if rough handling or prolonged storage is required. A preform is thus produced which is almost the final shape and can drop straight into the mold.

EXAMPLE 6

A stitched fabric with 18 oz/sq yard of continuous glass strands arranged with equal amounts in the 0° (warp), +45° and −45° directions is coated on a continuous basis. The fabric is dipped into an acrylic emulsion (Parachem 8444) with a solids content of 45% and a particle size of 200 nanometers. At a throughput of 55 yards/hour the fabric picked up 38% solids by weight. At 110 yds/hour the fabric picked up about 35% solids. The fabric was dried by passing through a 15 foot oven at 350° F. (177° C.) and then a 10 foot oven at 250° F. (121° C.). With this drying regime, a skin was formed on the outside of the prepreg by fusion of the acrylic while the bulk of the acrylic inside dried to a powder. This form allows maximum deformability of the prepreg while retaining polymer during handling. For maximum control of polymer weight all the polymer can be fused but then the prepreg becomes more difficult to handle.

EXAMPLE 7

The latex of Example 5 is applied to end-grain balsa and allowed to soak in. The acrylic coating is dried onto the balsa and then two prepressed plies of glass/acrylic are stacked each side of the balsa. A reduced pressure of 40 psi and a temperature of 350° F. (177° C.) produces a sandwich panel and provides excellent peel properties.

EXAMPLE 8

This example illustrates the advantageous effects, in some embodiments, of multiple coatings of latex. Particles can be concentrated into the center of the strand via successive exposures to the stable emulsion. Upon each coating, the resin contained in the strand increases as shown in Table 2. This process allows lower solids content latex to be used to make high solids content prepregs.

An ASA latex (C29441) and an ABS latex (C104) were both used in a series of coating experiments. The ASA latex contained 34% solids and the ABS latex contained 36% solids. These lattices were coated on a 12 oz/yd$^2$ glass fabric (EBX 1200) and a 12 oz/yd$^2$ graphite fabric—CBX1200. Line speeds were about 150 yds/hr into a dip bath of the latex. Glass was dried at 150 to 175 F and Graphite was dried at around 225 to 275° F.

TABLE 2

| Solids coated | Pick up % 1$^{st}$ pass | Pick up % 2$^{nd}$ Pass | Pick up % 3$^{rd}$ pass | Pick up % 4$^{th}$ pass |
| --- | --- | --- | --- | --- |
| C104 and EBX 1200 glass | 17 | 23 | 31 | 38 |
| C104 and CBX 1200 graphite fabric | 25 | 32 | 38 | 52 |
| C29441 and EBX 1200 glass | 14 | 19 | 28 | 36 |
| C29441 and CBX 1200 graphite fabric | 22 | 30 | 35 | 45 |

Two or more polymer latices can be used in the successive coating steps to build up the solids in a strand. This could be used—for example—to introduce a different polymer in the interply area between strands. A stiff polymer such as polystyrene might be used in the strand to translate the fiber properties fully into the composite. A toughened polystyrene might be used to provide a final coating thus conferring crack-controlling properties on the critical region between strands.

EXAMPLE 9

This example describes the preparation of a laminate board composite incorporating scrap fibrous, materials. Wood chips were coated with SA204 emulsion and allowed to air-dry. Chunks of glass fabric of about 1 in. to about 4 in. in size were soaked in the same emulsion and dried. A mixture of wood and fiberglass pieces was arranged in layers. The laminate was then pressed at 350° F. and 50 psi for about 2 minutes.

It is possible to make laminates with varying proportions of wood and glass fabric. The wood used was sawmill chips, biomass (chips from tree boles) and wood turnings (sold as pet bedding). The resulting laminates are shown in FIG. 11. These laminates vary from ⅜ in. to ¾ in. in thickness. The density of the laminates varied from 1.2 to 1.5 g/mL.

Those skilled in the art will appreciate that all parameters listed herein are meant to be examples and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed:

1. A method of forming a composite, comprising:
   providing a strand comprising a plurality of fibers;
   exposing the strand to a stable emulsion comprising polymer particles; and
   allowing the polymer particles to penetrate gaps between individual fibers.

2. The method of claim 1, wherein the penetration occurs to the extent that polymer particles substantially fill gaps between the individual fibers of the strand.

3. The method of claim 2, further comprising the step of fusing the polymer particles to provide a polymer matrix embedding the individual fibers of the strand.

4. The method of claim 3, wherein the fusing step comprises applying an elevated temperature to the particles.

5. The method of claim 4, wherein the elevated temperature is greater than a minimum film-forming temperature.

6. The method of claim 3, wherein the fusing step comprises applying a pressure to the particles.

7. The method of claim 6, wherein the pressure is no more than about 1750 kPa.

8. The method of claim 6, wherein the pressure is at least about 350 kPa.

9. The method of claim 1, further comprising the step of drying the particles below a minimum film-forming temperature.

10. The method of claim 1, further comprising the step of repeating the exposing step at least once.

11. The method of claim 1, wherein the emulsion comprises polymer particles in water.

12. The method of claim 1, wherein the emulsion further comprises a surfactant.

13. The method of claim 1, wherein the emulsion has a solids content of no more than about 60%.

14. The method of claim 1, wherein the emulsion has a solids content of no more than about 50%.

15. The method of claim 1, wherein the emulsion has a solids content from about 5% polymer particles to about 60%.

16. The method of claim 1, wherein the emulsion has a solids content from about 5% polymer particles to about 50%.

17. The method of claim 1, wherein the polymer particles have a mean diameter of no more than about 0.25 times the fiber diameter.

18. The method of claim 1, wherein the polymer particles have a mean diameter of no more than about 5 μm.

19. An article, comprising:
   a mixture comprising fibrous segments and polymer particles, a portion of the particles penetrating substantially all ends of individual fibers in the fibrous segments, and the entire article being substantially rigid.

20. The article of claim 19, wherein the article is a prepreg.

21. The article of claim 19, further comprising a plurality of porous segments wherein a portion of polymer particles substantially fill pores of the porous segments.

22. The article of claim 19, further comprising non-porous and non-fibrous fillers.

23. A composite, comprising outer layers of a fibrous sheet sandwiching a core comprising the article of claim 19.

24. A composite, comprising a layer of a fibrous sheet enclosing a core comprising the article of claim 19.

25. A composite, comprising:
   a plurality of fibrous segments; and
   a polymer matrix embedding the fibrous segments and ends of individual fibers of the fibrous segments.

26. The composite of claim 25, wherein the polymer matrix embedding the fibrous segments comprises a core, the composite further comprising outer layers of a fibrous sheet sandwiching the core.

27. The composite of claim 25, wherein the polymer matrix embedding the fibrous segments comprises a core, the composite further comprising an outer layer of a fibrous sheet enclosing the core.

* * * * *

UNITED STATES PATENT AND TRADEMARK OFFICE
CERTIFICATE OF CORRECTION

| | | |
|---|---|---|
| PATENT NO. | : 6,861,131 B2 | Page 1 of 7 |
| APPLICATION NO. | : 10/007055 | |
| DATED | : March 1, 2005 | |
| INVENTOR(S) | : David A. Evans | |

It is certified that error appears in the above-identified patent and that said Letters Patent is hereby corrected as shown below:

In the Drawings: Please replace Fig. 2A, Fig. 2B and Fig. 2C with:

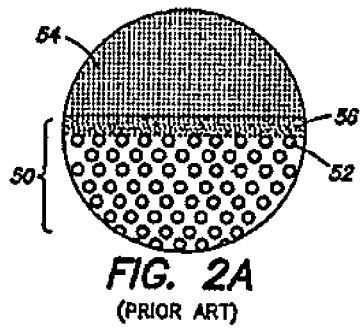

FIG. 2A
(PRIOR ART)

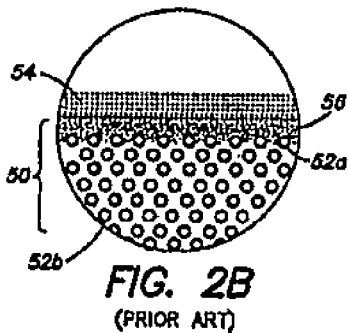

FIG. 2B
(PRIOR ART)

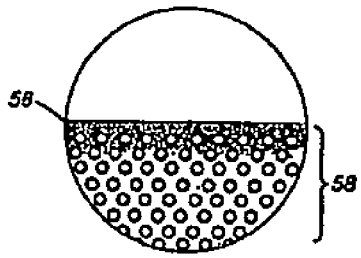

FIG. 2C
(PRIOR ART)

UNITED STATES PATENT AND TRADEMARK OFFICE
CERTIFICATE OF CORRECTION

PATENT NO.       : 6,861,131 B2
APPLICATION NO.  : 10/007055
DATED            : March 1, 2005
INVENTOR(S)      : David A. Evans It is certified that error appears in the above-identified patent and that said Letters Patent is hereby corrected as shown below:

In the Drawings: Please replace Fig. 6A, Fig. 6B, Fig. 6C and Fig. 6D with:

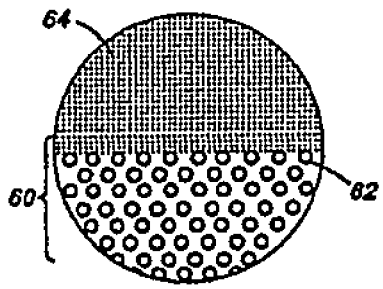
FIG. 6A

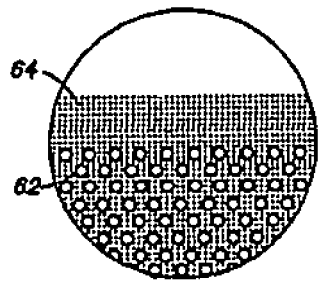
FIG. 6B

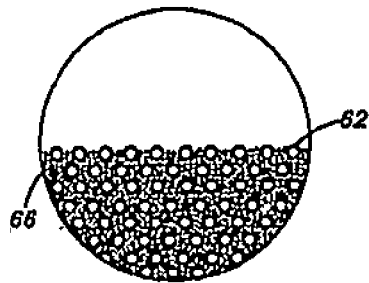
FIG. 6C

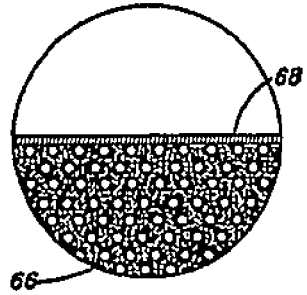
FIG. 6D

UNITED STATES PATENT AND TRADEMARK OFFICE
CERTIFICATE OF CORRECTION

PATENT NO.         : 6,861,131 B2                                       Page 3 of 7
APPLICATION NO. : 10/007055
DATED              : March 1, 2005
INVENTOR(S)       : David A. Evans It is certified that error appears in the above-identified patent and that said Letters Patent is hereby corrected as shown below:

In the Drawings: Please replace Fig. 7A and Fig. 7B with:

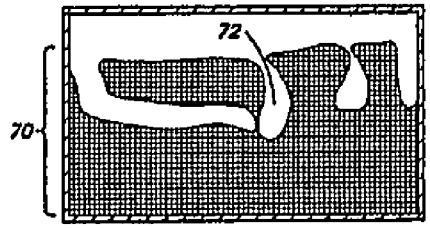

FIG. 7A
(PRIOR ART)

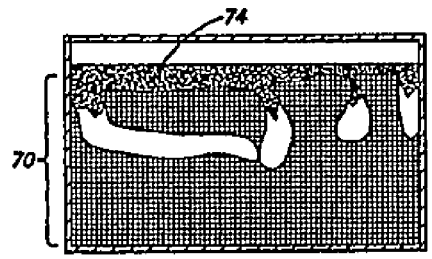

FIG. 7B
(PRIOR ART)

UNITED STATES PATENT AND TRADEMARK OFFICE
CERTIFICATE OF CORRECTION

| | | |
|---|---|---|
| PATENT NO. | : 6,861,131 B2 | Page 4 of 7 |
| APPLICATION NO. | : 10/007055 | |
| DATED | : March 1, 2005 | |
| INVENTOR(S) | : David A. Evans | |

It is certified that error appears in the above-identified patent and that said Letters Patent is hereby corrected as shown below:

In the Drawings: Please replace Fig. 8A and Fig. 8B with:

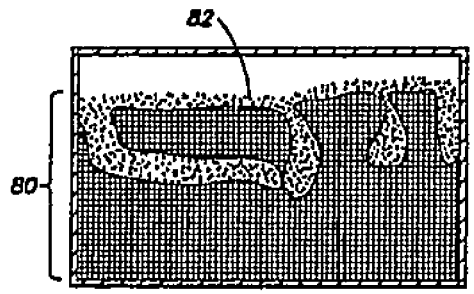

FIG. 8A

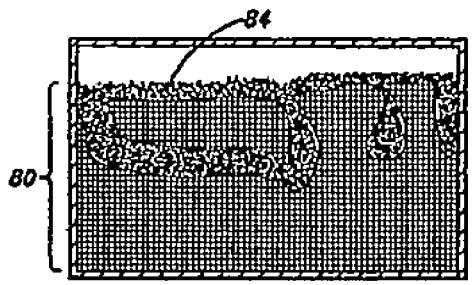

FIG. 8B

UNITED STATES PATENT AND TRADEMARK OFFICE
CERTIFICATE OF CORRECTION

PATENT NO.         : 6,861,131 B2                                    Page 5 of 7
APPLICATION NO.    : 10/007055
DATED              : March 1, 2005
INVENTOR(S)        : David A. Evans It is certified that error appears in the above-identified patent and that said Letters Patent is hereby corrected as shown below:

In the Drawings: Please replace Fig. 9 with:

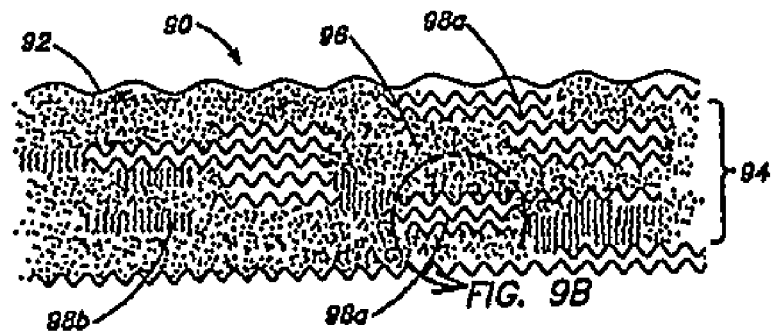

FIG. 9A

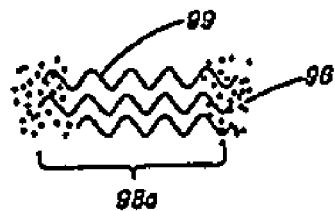

FIG. 9B

UNITED STATES PATENT AND TRADEMARK OFFICE
CERTIFICATE OF CORRECTION

PATENT NO.        : 6,861,131 B2                                    Page 6 of 7
APPLICATION NO. : 10/007055
DATED             : March 1, 2005
INVENTOR(S)       : David A. Evans It is certified that error appears in the above-identified patent and that said Letters Patent is hereby corrected as shown below:

In the Drawings: Please replace Fig. 10 with:

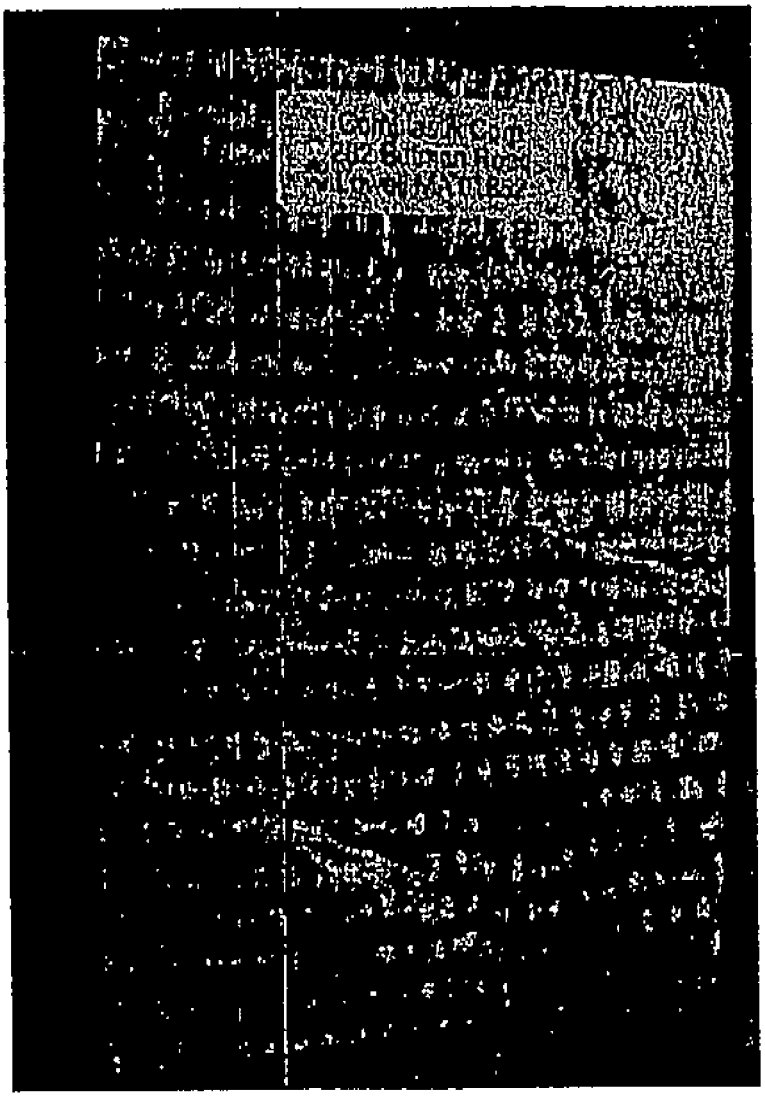

Fig. 10

UNITED STATES PATENT AND TRADEMARK OFFICE
CERTIFICATE OF CORRECTION

PATENT NO. : 6,861,131 B2
APPLICATION NO. : 10/007055
DATED : March 1, 2005
INVENTOR(S) : David A. Evans It is certified that error appears in the above-identified patent and that said Letters Patent is hereby corrected as shown below:

In the Drawings: Please replace Fig. 11 with:

FIG. 11

Signed and Sealed this

Seventh Day of October, 2008

JON W. DUDAS
*Director of the United States Patent and Trademark Office*